United States Patent [19]

Levine

[11] 4,398,259

[45] Aug. 9, 1983

[54] SNAP ACCELERATION METHOD OF DIAGNOSING FAULTS IN INTERNAL COMBUSTION ENGINES

[75] Inventor: David A. Levine, Westbury, N.Y.

[73] Assignee: Harris Corporation, Melbourne, Fla.

[21] Appl. No.: 174,546

[22] Filed: Aug. 1, 1980

[51] Int. Cl.³ .................... G01M 15/00; G06F 15/46
[52] U.S. Cl. .................. 364/551; 73/117.3; 364/431.01
[58] Field of Search .................. 364/550, 551, 431.01; 73/116, 117.3

[56] References Cited

U.S. PATENT DOCUMENTS

| | | | |
|---|---|---|---|
| 3,972,230 | 8/1976 | Hanson et al. | 73/116 |
| 3,994,160 | 11/1976 | Hanson | 73/116 |
| 4,064,747 | 12/1977 | Rackliffe et al. | 73/116 |
| 4,144,578 | 3/1979 | Mueller et al. | 364/551 X |
| 4,179,922 | 12/1979 | Bouverie et al. | 73/116 |
| 4,181,944 | 1/1980 | Yamauchi et al. | 364/431.06 |
| 4,295,363 | 10/1981 | Buck et al. | 73/117.3 |
| 4,302,815 | 11/1981 | Tedeschi et al. | 364/551 |

Primary Examiner—Felix D. Gruber
Attorney, Agent, or Firm—Yount & Tarolli

[57] ABSTRACT

A method and apparatus are disclosed for diagnosing faults in individual cylinders of an internal combustion engine. An engine (12) is accelerated, while an analyzer (10) provides measurements of the time intervals required for the engine to rotate for successive, equal angular increments as the engine is being accelerated, where each increment is a fraction of the rotation required for a single engine cylinder power contribution. The values of the resulting sequence of time interval measurements generally undulate with time about an average value due to the power contribution of each individual cylinder, with the average value of the time interval measurements and the magnitude of the undulations about this average value generally decreasing with time due to the acceleration of the engine. The analyzer (10) modifies the time interval measurements in the sequence so as to provide a modified sequence having a substantially constant average value and substantially constant magnitude of undulation. The analyzer (10) then compares the characteristics of the individual undulations in the modified sequence so as to diagnose faults in the individual cylinders in the engine.

9 Claims, 8 Drawing Figures

SNAP ACCELERATION METHOD OF DIAGNOSING FAULTS IN INTERNAL COMBUSTION ENGINES

BACKGROUND AND FIELD OF THE INVENTION

The present invention relates to methods of diagnosing faults in internal combustion engines, and more particularly to a snap acceleration test for diagnosing faults in individual cylinders of an engine during operation of the engine under loaded conditions.

One known method of testing internal combustion engines involves the taking of incremental rotational rate data while the engine is being rapidly accelerated from a relatively low speed to a relatively high speed. The patent to Hanson, U.S. Pat. No. 3,994,160 relates to a method employing such an acceleration burst test in order to provide an indication of the overall power of the engine. In the co-pending, commonly assigned patent application of Buck et al, Ser. No. 781,313, filed Mar. 25, 1977, now U.S. Pat. No. 4,295,363, and entitled "Apparatus for Diagnosing Faults in Individual Cylinders in an Internal Combustion Engine", a snap acceleration test is described wherein the data taken is utilized to diagnose faults in the individual cylinders in the engine. In the Buck et al. application, the data consists of a plurality of incremental time interval measurements, each measuring the amount of time required for the engine to rotate through a corresponding small angular increment, taken while the engine is accelerating. Because of the power contributions of the individual cylinders in the engine, these time interval measurements will have generally undulating values. In the Buck et al. application faults in the individual cylinders were determined by comparing the magnitude of these undulations of the individual cylinders, these magnitude values having first been normalized in accordance with the changing speed of the engine.

Although this prior snap acceleration test could successfully diagnose faults, the absolute magnitudes of the various measurements varied substantially as the tests were repeated. This had a tendency to reduce the credibility of the test to the user, even though the fault indications were, in fact, accurate.

SUMMARY OF THE INVENTION

It is an object of the present invention to provide an improved method of diagnosing faults in individual cylinders in internal combustion engines.

It is a further object of the present invention to provide a snap acceleration test which is different than that described in the Buck et al. application and which produces results that are more regular and repeatable.

It is another object of the present invention to provide method and apparatus for modifying the data acquired during snap acceleration of an engine such that the resulting data may be more readily analyzed to diagnose faults.

In accordance with the present invention, a method is provided of diagnosing faults in individual cylinders in an internal combustion engine. This method includes the steps of accelerating the engine and measuring the time intervals required for the engine to rotate through successive, equal angular increments as the engine is being accelerated, where each increment is a fraction of the rotation required for a single engine cylinder power contribution. A sequence of the interval measurement is therefore provided, the values of which generally undulate about an average value due to the power contributions of the individual cylinders, wherein the average value of the time interval measurements and the magnitude of the undulations about the average value generally decrease with time due to the acceleration of the engine. The method further includes the steps of modifying the time interval measurements in the sequence so as to provide a modified sequence having a substantially constant average value and magnitude of undulations and comparing characteristics of the individual undulations in the modified sequence so as to diagnose faults in the individual cylinders in the engine.

BRIEF DESCRIPTION OF THE DRAWINGS

The foregoing and other objects and advantages of the present invention will become more readily apparent from the following detailed description, as taken in conjunction with the accompanying drawings, wherein.

DETAILED DESCRIPTION

Figure 1:
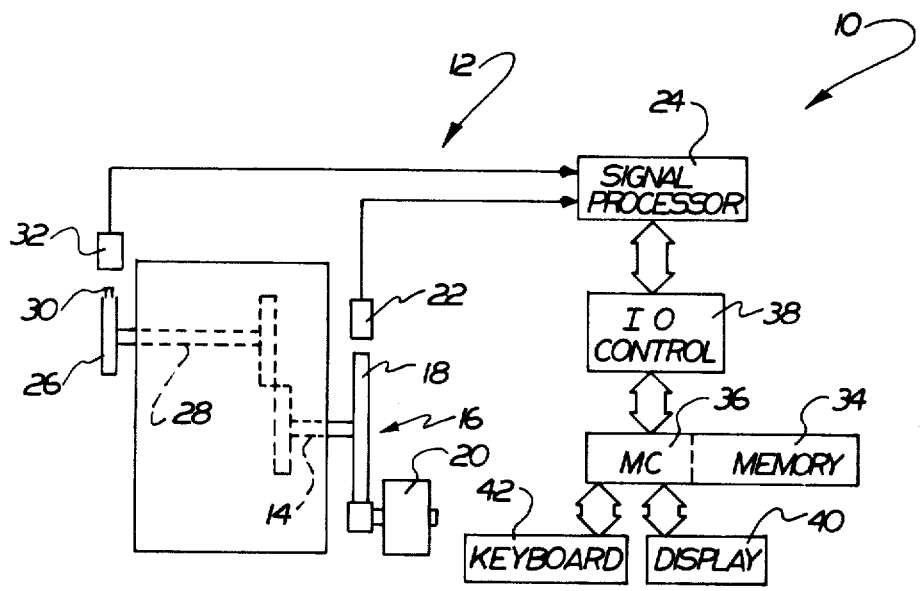
FIG. 1 is a block diagram of an engine testing system in which the present invention may find convenient use.

Referring now to the drawings, wherein the showings are for purposes of illustrating a preferred embodiment of the invention only, and not for purposes of limiting it, FIG. 1 illustrates the analyzer 10 in conjunction with a diesel engine 12 which is to be tested.

Whereas the invention is described herein in conjunction with compression ignition (diesel) engines, it will be appreciated that the invention is not limited thereto as it may also be used for testing other types of engines, such as spark ignition engines. In the example given herein, the diesel engine is a fuel injected engine having six, in-line cylinders. The firing order of the cylinders is 1-5-3-6-2-4. It is a four cycle engine which means that the crankshaft requires two full revolutions for all cylinders to fire. A crankshaft 14 carries a flywheel 16 having a ring gear 18 carried on its outer periphery. This ring gear is provided with 118 evenly spaced ring gear teeth which extend radially outward in an annular array. These ring gear teeth are employed during starting of the engine, and are then engaged by a crank motor 20 so as to drive the crankshaft.

The analyzer 10 employs a sensor 22 for sensing the passage of each ring gear tooth past a particular point. The sensor will preferably be of the reluctance or magnetic type, and will be mounted on the flywheel housing (not shown) so that the sensor extends through the housing and is positioned to produce one pulse upon the passage of each tooth of the ring gear. These pulses are supplied to a signal processor 24, which may take the form described in detail in the Buck et al. application referred to above. Thus, for each revolution of the crankshaft 14, the sensor 22 will produce a total of 118 pulses to the signal processor 24. Since one engine cycle requires two revolutions of the crankshaft, 236 pulses will be supplied to the processor for each engine cycle.

As mentioned previously, the engine being described is a six cylinder engine, each engine cycle will therefore include six power periods with each power period including a compression stroke and an acceleration or power stroke. The compression and acceleration strokes in each of the six power periods will influence the duration of the time intervals between the pulses produced by the sensor 22. As has been described in the Buck et al. application and also in other patents such as Racliffe et al., U.S. Pat. No. 4,064,747, these varying time intervals may be used for diagnosing faults in the individuals cylinders of the internal combustion engine.

In order to relate the pulses provided by the sensor 22 to the respective compression and acceleration strokes of particular cylinders, some means will generally be provided for indicating when the engine is at a particular point in its cycle. In the described embodiment, this is accomplished by producing one pulse, referred to hereinafter as a crank marker pulse, at a specific point in each engine cycle. To produce this pulse, a disc 26 is mounted to the end of a camshaft 28 driven by the crankshaft 14. Attached to the disc 26 is a pin 30 (which may be a bolt or the like) whose passage is sensed by another suitable reluctance type sensor 32. The gear linkage between the camshaft 28 and the crankshaft 14 is such that the camshaft 28 rotates at one-half the speed of the crankshaft 14, thereby rotating one full revolution for each cycle of the engine. The sensor therefore produces one crank marker pulse at a known point in each engine cycle, which pulses are then used to correlate ring gear pulses to point in the engine cycle.

The signal processor 24 receives the pulses from the two sensors 22 and 32 and forwards data, in the form of time interval measurements, for storage in a memory 34 associated with a microcomputer 36. An input/output control 38 is controlled by the microcomputer 36 to manipulate the signal processor 24 and control the entry of data into the memory 34 associated with the microcomputer 36. The contents and operation of the signal processor 24 and input/output control 38 may be as described in the aforemention Buck et al. application.

The samples forwarded to the signal processor take the form of multibit digital words. For each engine cycle of the engine 12, there will be 236 samples, each representing the time interval between successive pulses provided by the flywheel sensor 22. Upon the completion of the taking of samples by the signal processor 24 and the storage of these samples in the memory 34, the microcomputer 36 will process the samples to make a full diagnosis. When the diagnosis has been completed a suitable display representative of the diagnosis is presented on a visual display 40, which may be a CRT, a series of indicator lights, a suitable alphanumeric display, etc.

It is contemplated that the analyzer will be employed for testing various engine types; information which must be entered into the computer to identify the engine type and various engine parameters will be entered by the operator through a keyboard 42. Preferably the display 40 will provide appropriate prompting messages to the operator to assist him in the entry of the necessary information.

Figure 2:
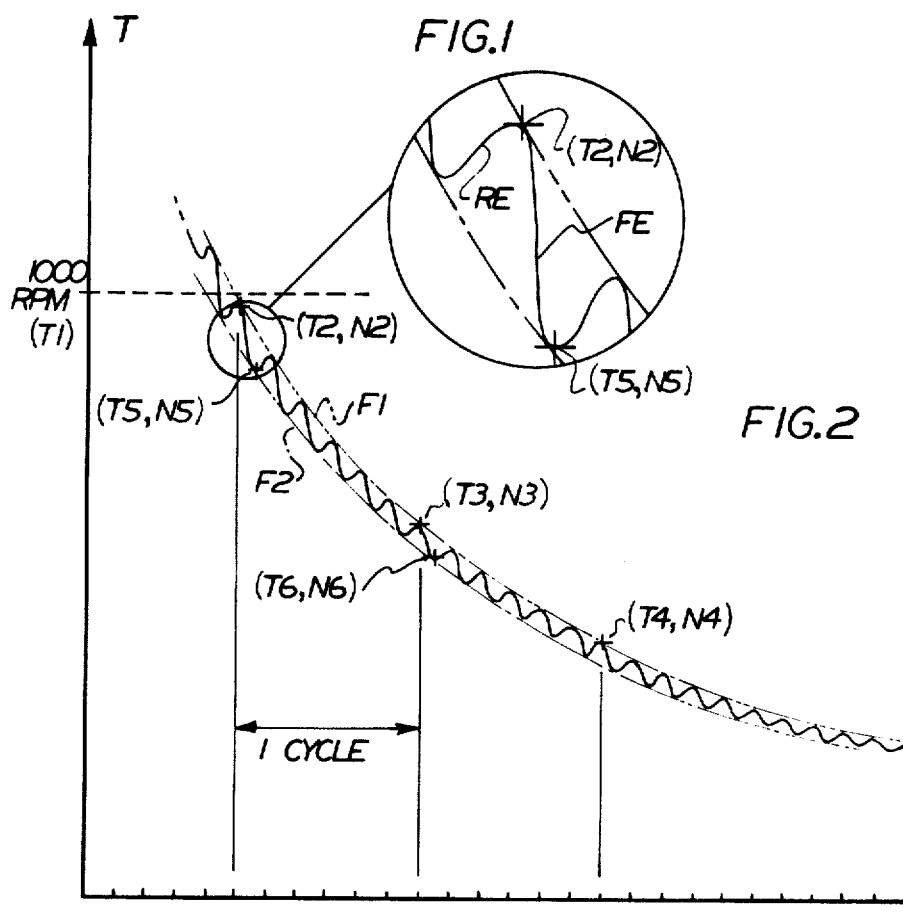
FIG. 2 is an idealized graph illustrating the manner in which the time interval measurements taken by the apparatus of FIG. 1 decrease in time due to the acceleration of the engine.

One of the tests performed by this analyzer to diagnose faults in an internal combustion engine involves the rapid acceleration of the engine from an idle speed to a much higher speed. Thus, this test is made with the engine operating, and is initiated when the engine 12 is idling under normal idle conditions. In performing the test, the operator will snap the throttle of the engine 12 to the wide open position so that the engine will rapidly accelerate from the idle speed to some higher speed. The curve in FIG. 2 shows an idealized plot of the resulting time intervals with respect to ring gear teeth. The ordinant represents the duration of individual time intervals and the abscissa represents the number of the tooth for which a given time interval measurement was taken (or, equivalently, the number of the time interval measurement). (In examining this graph it will be remembered that speed varies inversely with interval time. Thus, the reduced amplitude of the graph at higher N values represents an increase in the speed of the engine.)

It will be noted that the graph represented by the sequence of time interval measurements has a generally decreasing average value, and has undulations superimposed on that decreasing average value, where the undulations themselves diminish in amplitude as well. Each of these undulations represents the power contribution of one single corresponding cylinder of the engine 12. Thus, the rising edge RE of each undulation represents a compression stroke of the corresponding cylinder, whereas the falling edge FE represents the acceleration or power stroke of that cylinder. By examining the magnitudes of the compression and power strokes relative to corresponding strokes of the other cylinders, the propriety of the functioning of the individual cylinders of the engine under loaded conditions may be determined. In accordance with the present invention, this generally decreasing, undulating characteristic illustrated in FIG. 2 is first modified before the undulations produced by the individual cylinders are compared to determine cylinder performance.

Figure 3:
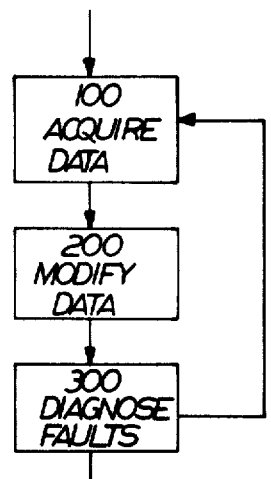
FIGS. 3–6 are flow charts representing the operation of the apparatus of FIG. 1 in performing the method of the present invention.

As illustrated generally in FIG. 3, which is a representation of the overall flow of operations in the microcomputer 36 in performing the snap acceleration test, this method involves three procedures, including a data acquisition procedure 100, a data modification procedure 200, and a data diagnostic procedure 300.

Stated generally, the purpose of the data acquisition procedure 100 is to acquire a sequence of time interval measurements (to be stored in the memory 34) during the rapid acceleration of the engine from an idle speed to a faster speed.

The data modification procedure 200 eliminates the generally decreasing trend of the average of the time interval measurements, as well as the decreasing magnitude of the undulations which are imposed upon this moving average.

The diagnostic procedure compares the undulations in the modified sequence of data to diagnose faults in the individual cylinders. These three procedures will now be described in greater detail.

Data Acquisition

Figure 4:
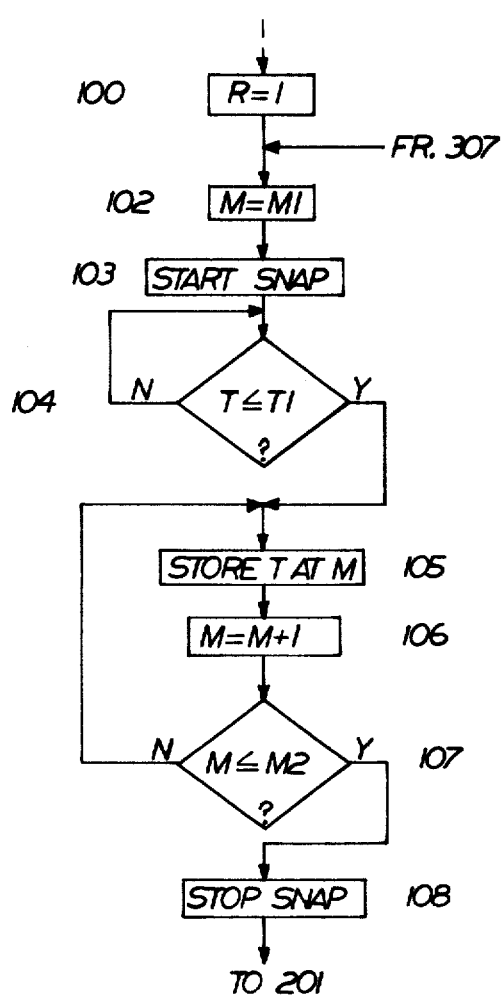

During the data acquisition procedure the microcomputer 36 provides appropriate displays on the display 40 to advise the operator when to start and to stop a snap acceleration of the engine. This procedure also controls the transferal of the time interval measurements from the signal processor 24 to the memory 34 for later diagnosis in the modification and diagnostic procedures. The procedure, as illustrated in FIG. 4, includes the following steps:

| STEP | OPERATION |
|---|---|
| 101 | In this step a counting variable R is initialized to a value of 1. The purpose of this counting variable R is to keep track of the number of snap accelerations runs which are performed. (A number of runs are performed and the results averaged so as to eliminate statistical variations in the individual cylinder performance data.) |
| 102 | The initial value of the data storage memory address (variable M) is set to a value of M1, which represents the first memory address on which the time intervals are to be stored. Successive time interval measurements will be stored in successive memory addresses, beginning with memory address M1. |
| 103 | The microcomputer 36 causes the display 40 to instruct the operator to begin the snap acceleration test by snapping the throttle of the engine 12 to the wide open position. |
| 104 | The microcomputer examines the time interval measurements being provided thereto by the signal processor 24 and compares these samples with a threshold value T1. The microcomputer repeats this step until a time interval measurement is located which has a value smaller than this threshold value. This threshold measurement may correspond, for example, to an engine speed of 1,000 rpm. Thereafter, the procedures continues on to step 105. |
| 105 | The time interval measurement received from the signal processor 24 is stored at location M (which, it will be remembered, will initially have a value of M1). |
| 106 | The memory address is incremented by 1 so that the next succeeding time interval measurement will be stored in the next succeeding memory space. |
| 107 | The memory address is compared with a limiting address M2. The number of memory spaces between the initial memory address M1 and the final memory address M2 is sufficient so that time interval measurements from at least three full engine cycles can be stored therein. In the event that the present memory address M is less than or equal to the limiting address M2, then insufficient time interval measurements have been taken and the program jumps back to step 105, causing the next time interval measurement to be stored at the new memory location. In the event the memory address is equal to the limiting address M2, the programs will continue with step 108. |
| 108 | When all of the memory spaces between the initial memory address M1 and the final memory address M2 have been filled with time interval measurements, the data acquisition portion is complete and the microcomputer 36 causes the display 40 to display a "stop snap" indication to the operator, instructing him to return the throttle to its minimum fuel, idle position. The program then continues on with the data modification procedure. |

Data Modification Procedure

In this procedure, the data acquired in the data acquisition procedure 100 is modified so as to eliminate the decreasing trend or average value of the data, as well as the generally decreasing magnitude of the undulations which are imposed upon this moving average. The purpose of this is to provide a sequence of time interval measurements which can more readily be compared one against another. In order to accomplish this, the data modification procedure matches two mathematical curves to selected peaks and selected valleys, respectively, of the time interval measurement curve illustrated in FIG. 2, and then uses these matched curves to modify the data.

More specifically, the data modification procedure selects three peaks (T2, N2); (T3, N3); and (T4, N4) which are one engine cycle apart so that each peak represents the peak of an undulation produced by the same cylinder. A generalized hyperbolic function (F1) having three unknown coefficients is then matched to these three data points so as to provide a mathematical function which varies smoothly and monotonically (that is, either continually increasing or continually decreasing) and which generally follows the peaks of the undulations in the acquired data.

Thereafter, two data points corresponding to valleys one engine cycle apart are selected, and are used to match a second, less generalized hyperbolic function ($F_2$) having only two unknown coefficients. The resulting mathematical function will again be smoothly and monotonically varied, and will generally follow the valleys of the data.

The resulting curves F1 and F2 match the acceleration trends of the engine. It will be noted that these curves might deviate substantially from this desired form if data points were selected which were not an integral number of engine cycles apart, i.e., if data points were selected which represented power contributions by different cylinders. Individual cylinder performance variations can perturb the relative values of such data points to the extent that they do not collectively characterize the general acceleration trend of the engine.

Figure 5:
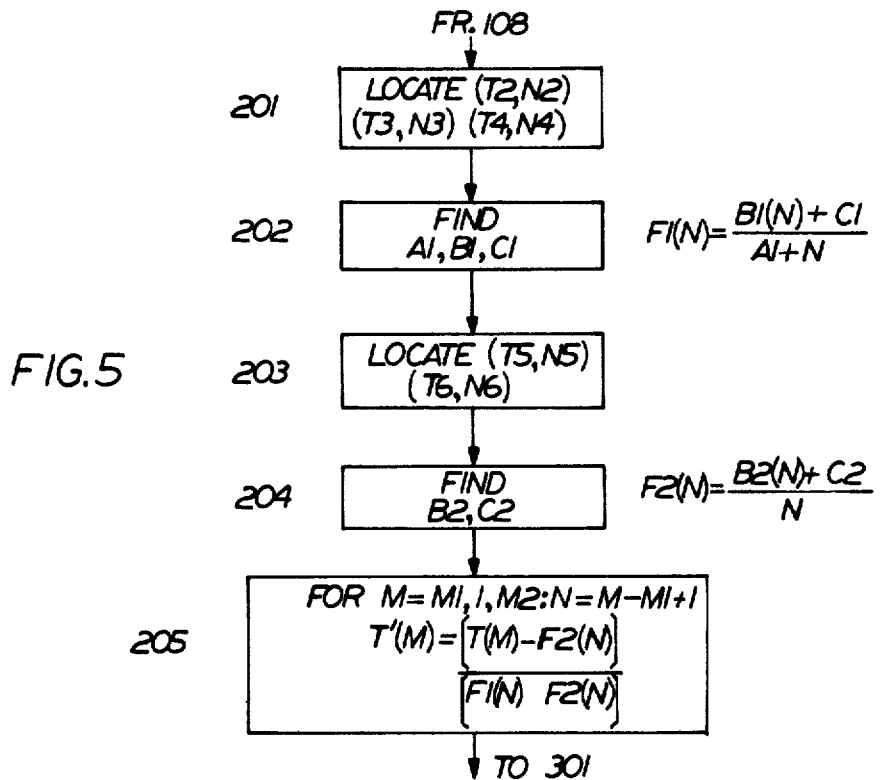

Since the magnitude of the undulations is gradually decreasing, the separation between these two functions F1 and F2 is similarly decreasing. Therefore, these two functions F1 and F2 properly characterize not only the moving average of the time interval measurements, but also the decreasing magnitude of the undulations which are superimposed upon the moving average. These two functions are used to modify the stored data to provide data having a generally constant average and a constant magnitude of undulations. The manner in which this is accomplished is described hereinafter. The procedure, as illustrated in FIG. 5, includes the following steps:

| STEP | OPERATION |
|---|---|
| 201 | The three data points used to match the upper hyperbola F1 are selected. The first data point is selected by locating the first peak in the stored data. The time interval measurement (T2) associated with this peak is stored, together with the number of the tooth (N2) to which this measurement corresponds. The tooth number is determined by subtracting M1 (which, it will be recalled, is the initial memory address beginning from which the time interval measurements are stored) from the actual memory address in which that time interval measurement is stored. This N number does not necessarily correspond to any given tooth on the flywheel, but rather represents the number of the sample which was taken. The other two data points are selected by counting 236 time interval measurements following the time interval measurement which was selected for the first data point (i.e., N2 = N1 + 236; N3 = N1 + 472). Since the flywheel has 118 teeth on it, there are 236 teeth in a complete engine cycle, hence the 236th time interval measurement following the first data point should correspond to the same point in the cycle at which the first data point was taken, and hence will correspond to a peak of an undulation for the same cylinder. |
| 202 | The function F1 has three constants which must be |

Figure 7:
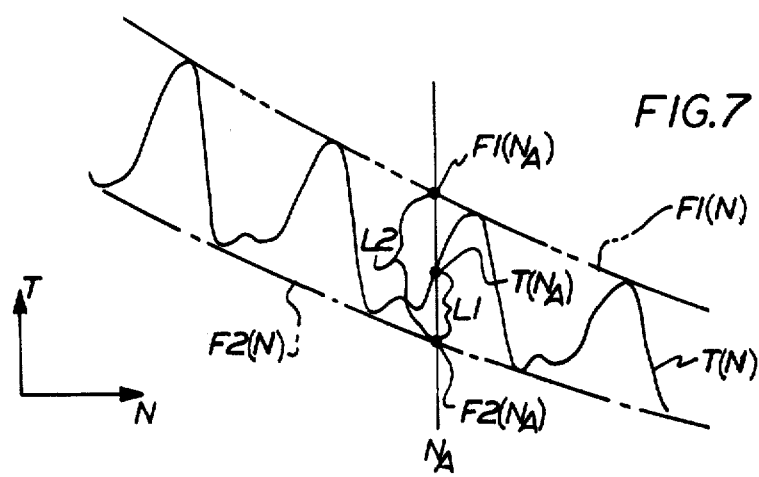
FIG. 7 is a graphical representation of a portion of the data taken by the apparatus of FIG. 1, and is useful in understanding the manner in which the sequence of time interval data is modified.

| STEP | OPERATION |
|---|---|
| | determined: A1, B1, and C1. This function F1 has an argument of (N) and hence is evaluated in accordance with this number N. The function F1 has the following form:<br>F1 = [(B1)N + C1]/(A1 + N)   (1)<br>Where F1 is the time interval value, N is the sample number, and A1, B1, and C1 are constants whose values must be determined. By plugging the three data points into this equation, three equations are produced in three unknowns. By solving for these three unknowns A1, B1, and C1, the function F1 is completely matched to the three data points. This function F1 describes a hyperbola which passes through these data points. |
| 203 | In this step the data points used to match the second hyperbola are located. The first data point (T5, N5) is located by examining the stored data to locate the first valley following the peak identified by the data point (T2, N2). The second data point is then selected by, again, counting 236 time interval measurements following the fifth data point (i.e., N6 = N5 + 236). |
| 204 | The function F2 has two constants whose values must be determined in order to match the function F2 to the valleys represented by data points 5 and 6. The function F2 has the following form:<br>F2 = [B2N + C2]/N   (2)<br>Where F2 is the time interval value, N is the sample number, and B2 and C2 are the unknowns whose values must be determined. The function F2 again describes a hyperbola, in this case having the horizontal axis as an asymptote. Consequently, this function is a smoothly varying monotonic function which is evaluated in accordance with the number N representing the sample number. In this step the two constants B2 and C2 are determined by plugging the data points into the function F2 to thus produce two equations and two unknowns. These equations can then be readily solved to determine the values of the constants B2 and C2. |
| 205 | In this step all of the stored data is modified in accordance with the hyperbolas defined by functions F1 and F2 having the constants as determined in steps 202 and 204. This modification process can most readily be understood through reference to FIG. 7, which is a graphical representation of the time interval data as acquired in procedure 100, as well as the two functions F1 and F2 which generally follows the peaks and valleys of the undulations. In order to modify the data in accordance with these two hyperbolas F1 and F2, a ratio is established of the distance between a given data point and the lower hyperbola (represented by line length L1 in FIG. 7) and the total distance between the upper and lower hyperbolas at that sample number (represented by line length L2 in FIG. 7). If this ratio is determined for a data point which falls precisely on the upper hyperbola F1, the ratio will be equal to 1 since the line lengths L1 and L2 are equal. On the other hand, evaluation of this ratio for a data point falling on the lower hyperbola will produce a ratio of zero since the line length L1 will then be equal to zero. It can thus be seen that this ratio varies generally between values of zero and 1, although excursions beyond these bounds will be caused by asymmetry in the power contributions of the various cylinders. In this step each one of the stored time interval measurements is replaced by a modified time interval measurement represented by its corresponding ratio, as defined above. The N value used to evaluate the functions F1 and F2 is determined by subtracting the starting memory address (M1) from the address (M) of the time interval measurement then being modified and adding one to the result. The two functions F1 and F2 are then evaluated for this N value. Finally, the time interval measurement T(M) is replaced by a modified time interval measurement T'(M) as defined by the following equation: |

| STEP | OPERATION |
|---|---|
| | $$T'(M) = \frac{[T(M) - F2(N)]}{[F1(N) - F2(N)]} \quad (3)$$<br>After each of the time interval measurements has been modified in this manner, the test continues with procedure 300. |

Fault Diagnostic Procedure

Figure 6:
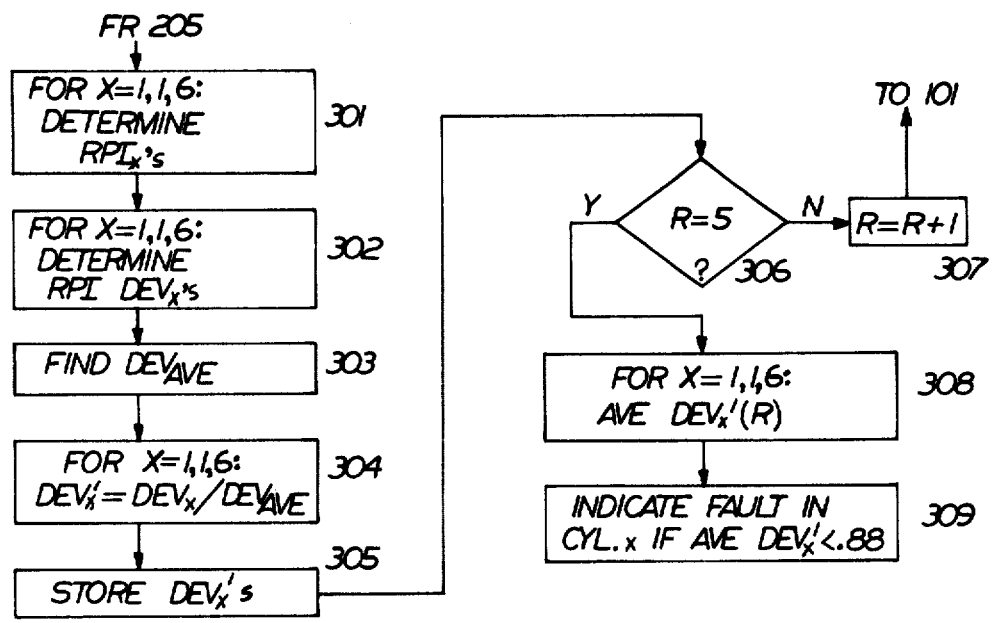
Figure 8:
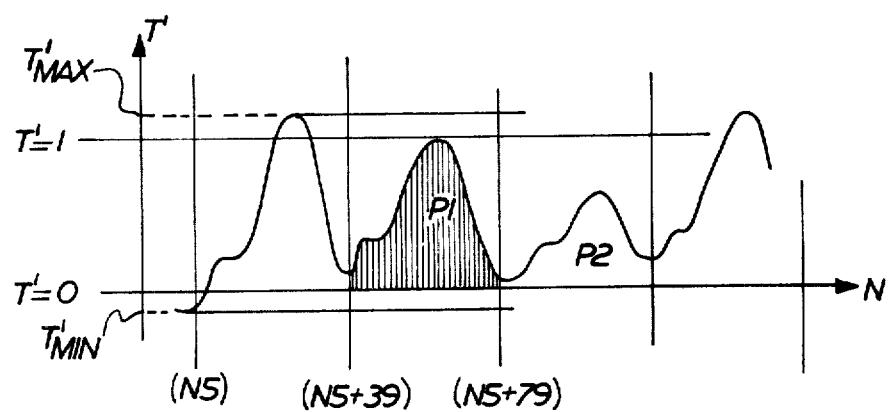
FIG. 8 is a graphical representation of the modified sequence of time interval measurements, and is useful in understanding the manner in which this modified sequence is used to diagnose faults in individual cylinders in an internal combustion engine.

The modified data generated by the data modification procedure 200 has the form generally illustrated in FIG. 8. As can be seen in this Figure, the undulations now have a relatively constant average, and vary generally between the limits of 0 and 1. There are asymmetries in these peaks, however these are generally due to differences in the power contributions of the individual cylinders, rather than due to a systematic change in the data due to an increase in speed of the engine. This procedure compares the performance of individual cylinders by comparing peaks in the modified data. More specifically, faults are located by determining the integral under each of the peaks, and determining the extent to which the integral for each peak deviates from the integral of the next succeeding peak. If for a given peak P1 the integral thereof is substantially less than the integral for the next succeeding peak P2, a fault is indicated. This procedure, as illustrated in FIG. 6, includes the following steps:

| STEP | OPERATION |
|---|---|
| 301 | A raw power index (RPI) is determined for each of the six cylinders associated with the engine. This raw power index corresponds to the integral under the peak corresponding to a given cylinder, and is determined by adding together all of the time interval measurements associated with that peak. The boundaries of a given peak are located by counting time interval measurements from a single "reference" valley such as the valley associated with the data point (T5, N5). The number of succeeding time interval measurements which are associated with that peak is equal to the total number of time interval measurements in a single engine cycle, divided by the total number of cylinders. In this case, since there are 236 time interval measurements in a single engine cycle and six cylinders, it follows that there will be 39.3 time interval measurements per cylinder peak. Thus, the boundaries between successive cylinder peaks will be at time interval measurement number: N5 + (39, 79, 118, 157, 197, and 236). It will be known which of these peaks corresponds with which specific cylinders since the occurrence of the crank angle marker pulse will uniquely identify a given one of the cylinders, and since the firing order is known. |
| 302 | In this step, the deviations (DEV) in the raw power indices are determined. For each cylinder, that cylinder's RPI is subtracted from the RPI of the next succeeding cylinder in the firing order. These RPI differences may occasionally be negative, since the RPI for the next succeeding cylinder may be smaller than the RPI for the cylinder under consideration. To avoid this, the RPI deviation DEV is defined as being a constant (RPI$_{max}$) minus the difference between the two raw power indices. This constant (RPI$_{max}$) is calculated to be large enough so that the resulting DEV will in all cases be positive. In the embodiment being described, this constant RPI$_{max}$ is equal to the difference between the maximum and minimum time intervals of the modified sequence (i.e., T'$_{max}$ and T'$_{min}$ respectively), times the number of teeth in an individual cylinder (i.e., in this case 39). This |

| STEP | OPERATION |
|---|---|
| | constant represents the area encased within a rectangle having an upper boundary corresponding to the maximum time interval value of the modifed sequence, a lower boundary corresponding to the minimum value of the modified time interval sequence and side boundaries spaced by 39 "N" values (see FIG. 8). |
| 303 | The average deviation is determined by adding together the deviations DEV for all six cylinders, and dividing by six. |
| 304 | The deviations for the individual cylinders are normalized in accordance with the average deviation by dividing each cylinder's DEV by the average deviation determined in step 303. |
| 305 | These normalized deviations are now stored within the memory for later use. |
| 306 | In this step the counting variable R is compared with 5. If R is less than 5, then the program continues on to step 307. If R is equal to 5, on the other hand, (indicating that 5 different snap acceleration runs have been completed, thus providing 5 stored normalized deviation values for each cylinder) then the progam jumps to step 308. |
| 307 | The counting variable R is incremented by one, and the program jumps to step 101 in the data acquisition procedure 100. The program thus will continue running through the data acquisition, data modification and data analysis procedures until five different runs have been completed. |
| 308 | For each cylinder, the five values accumulated during the five runs are averaged to provide an average normalized deviation for that cylinder. These values vary around an average value of 1.00. Average normalized deviations greater than 1.00 represent stronger cylinders; those less than 1.00 represent weaker cylinders. It is these average deviations for the respective cylinders which are used for fault diagnosis. |
| 309 | Each of the average normalized deviations is compared with a limit to determine whether or not a fault has occurred. In the embodiment being described, this limit is .88. If the average normalized deviation for a given cylinder is less than this limit, then a fault is indicated. If the average normalized deviation for a given cylinder is above this average, however, then no fault is indicated. This comparison is done for all six cylinders, resulting in six fault/no fault decisions. |
| 310 | The display 40 is controlled by the microcomputer to indicate both the average normalized deviations for the respective cylinders, and the resulting fault decisions determined in step 309. The snap acceleration test is now completed and repair of the engine under test may be undertaken in accordance with the findings of the test. |

Thus, a snap acceleration test has been provided wherein the engine is snapped from an idle speed to a much higher speed, with time interval data being taken during acceleration of the engine. This time interval data is first modified so as to produce a modified sequence of data in which characteristics of the power contribution of each cylinder can be directly compared against those of the other cylinders. In addition, a specific method of providing this comparison has been described.

Although the invention has been described with respect to a preferred embodiment, it will be appreciated that various rearrangements and alterations of parts may be made without departing from the spirit and scope of the present invention, as defined in the appended claims.

What is claimed is:

1. A method of diagnosing faults in individual cylinders in an internal combustion engine, comprising the steps of:
   accelerating said engine,
   measuring the time intervals required for the engine to rotate through successive, equal angular increments as said engine is being accelerated, each increment being a fraction of the rotation required for a single engine cylinder power contribution, thereby producing a sequence of time interval measurements the values of which generally undulate about an average value due to the power contributions of individual cylinders, and wherein the average value of said time interval measurements and the magnitude of the undulations about the average value generally decrease with time due to the acceleration of said engine,
   modifying values corresponding to said values of said time interval measurements in said sequence so as to provide a modified sequence having a substantially constant average value and magnitude of undulation regardless of the acceleration of said engine, and
   comparing characteristics of individual said undulations in said modified sequence so as to diagnose faults in individual cylinders in said engine,
   wherein said step of modifying includes selecting at least two time interval measurements taken an integral number of engine cycles apart, matching a regular, monotonic function to said selected measurements, and modifying said time interval measurements in accordance with said matched function.

2. A method of diagnosing faults in individual cylinders in an internal combustion engine, comprising the steps of:
   accelerating said engine,
   measuring the time intervals required for the engine to rotate through successive, equal angular increments as said engine is being accelerated, each increment being a fraction of the rotation required for a single engine cylinder power contribution, thereby producing a sequence of time interval measurements the values of which generally undulate about an average value due to the power contributions of individual cylinders, and wherein the average value of said time interval measurements and the magnitude of the undulations about the average value generally decrease with time due to the acceleration of said engine,
   modifying values corresponding to said values of said time interval measurements in said sequence so as to provide a modified sequence having a substantially constant average value and magnitude of undulation regardless of the acceleration of said engine, and
   comparing characteristics of individual said undulations in said modified sequence so as to diagnose faults in individual cylinders in said engine,
   wherein said step of modifying includes the steps of matching a first regular, monotonic function to selected peaks of said undulations, matching a second regular, monotonic function to selected valleys of said undulations, and utilizing said first and second matched functions to modify said time interval measurements.

3. A method as set forth in claim 2, wherein at least one of said matching steps includes the step of selecting at least two time interval measurements taken an integral number of engine cycles apart and matching said function to said selected time interval measurements.

4. A method as set forth in claim 2, wherein at least one of said matching steps includes the step of matching a hyperbolic function to said selected values of said undulations.

5. A method as set forth in claim 2, wherein said first and second functions comprise functions F1 and F2, respectively, evaluated in accordance with a number N identifying the numerical location of a corresponding time interval measurement T(N) in said sequence of measurements to provide corresponding values F1(N) and F2(N), respectively, and wherein said step of utilizing said first and second functions to modify said measurements comprises the step of determining the ratio of T(N) minus F2(N) to F1(N) minus F2(N) for each said measurement, said ratio serving as said modified measurement.

6. A method of diagnosing faults in individual cylinders in an internal combustion engine, comprising the steps of:
   accelerating said engine,
   measuring the time intervals required for the engine to rotate through successive, equal angular increments as said engine is being accelerated, each increment being a fraction of the rotation required for a single engine cylinder power contribution, thereby producing a sequence of time interval measurements the values of which generally undulate about an average value due to the power contributions of individual cylinders, and wherein the average value of said time interval measurements and the magnitude of the undulations about the average value generally decrease with time due to the acceleration of said engine,
   modifying values corresponding to said values of said time interval measurements in said sequence so as to provide a modified sequence having a substantially constant average value and magnitude of undulation regardless of the acceleration of said engine, and
   comparing characteristics of individual said undulations in said modified sequence so as to diagnose faults in individual cylinders in said engine,
   wherein said step of comparing characteristics of said undulations comprises the step of determining the integral of each one of the plural said undulations occurring in time interval measurements taken over at least one engine cycle, and, for each of said undulations, comparing the integral of that undulation with the integral of the next succeeding undulation to diagnose faults in said engine.

7. A method as set forth in claim 6, wherein the step of comparing said integrals comprises the steps of determining, for each of said undulations, the difference between the associated integral and the integral associated with the next succeeding undulation, adding a predetermined value to each said difference to provide a corresponding sum, dividing each said sum by the average said sum to provide a corresponding quotient, and comparing each said quotient with a predetermined value to determine faults in said engine.

8. Apparatus for diagnosing faults in individual cylinders in an internal combustion engine as the engine is being accelerated, comprising:
   means responsive to rotation of said engine for providing a plurality of successive signals each having a value indicating the time interval taken by the engine to rotate through a corresponding one of successive, equal angular increments as said engine is being accelerated, each angular increment being a fraction of the rotation required for a single engine cylinder power contribution, thereby producing a sequence of signals the values of which generally undulate about an average value due to the power contributions of individual cylinders and wherein the average value of said signals and the magnitude of the undulations about the average value generally decrease with time due to the acceleration of the engine;
   means for modifying the values of said sequence of signals so as to provide a modified sequence having a substantially constant average value and magnitude of undulation regardless of the acceleration of the engine, and for comparing characteristics of individual said undulations in the modified sequence so as to diagnose faults in individual cylinders in the engine.

9. Apparatus as set forth in claim 8 wherein said modifying and comparing means comprise programmed computer means programmed to first modify the values of said sequence to provide said modified sequence and then compare characteristics of individual said undulations in the modified sequence.

* * * * *